United States Patent [19]
Davenport et al.

[11] Patent Number: 5,323,592
[45] Date of Patent: Jun. 28, 1994

[54] DUFFER WITH IMPROVED LUG CONFIGURATION

[75] Inventors: Donald K. Davenport, Woodburn; Joel M. Schreiner, Ankeny, both of Iowa

[73] Assignee: Deere & Company, Moline, Ill.

[21] Appl. No.: 42,428

[22] Filed: Mar. 31, 1993

[51] Int. Cl.⁵ ............................. A01D 46/10
[52] U.S. Cl. ............................. 56/33; 56/41
[58] Field of Search ............... 56/33, 36, 40, 41

[56] References Cited
U.S. PATENT DOCUMENTS

| | | | |
|---|---|---|---|
| 3,411,278 | 11/1968 | Grant | 56/41 |
| 4,928,459 | 5/1990 | Thedford et al. | 56/41 X |
| 5,014,502 | 5/1991 | Richman et al. | 56/41 |

*Primary Examiner*—Thuy M. Bui

[57] ABSTRACT

A doffer for use with a spindle type cotton harvester is provided which has non-radial lugs to provide a better distribution of stripping and unwrapping force components for enhanced doffing action. The leading edges of the lugs are curved and are angled with respect to the radial direction to provide a scissors action relative to the spindles as the doffer rotates for improved doffing and wear distribution. The lugs provide an immediate unwrapping component upon initial contact with the cotton-wrapped spindles, with less stripping action to reduce the amount of cotton forced between the spindles and the doffer. In another embodiment of the invention, lugs with different pitches are supported in alternating fashion so that the action of the lugs with the greatest pitch provide a large unwrapping force and the smaller pitched lugs provide a large stripping force. The rear portions of the lugs are curved for increased cotton throwing clearance.

23 Claims, 6 Drawing Sheets

DUFFER WITH IMPROVED LUG CONFIGURATION

BACKGROUND OF THE INVENTION

1. Field of the Invention:

The present invention relates generally to cotton harvesters and, more specifically, to an improved doffer for doffing cotton from picker spindles.

2. Related Art:

In the mechanical harvesting of cotton with spindle-type picking units, such as exemplified by the John Deere Model 9960 Cotton Picker, rotating spindles project into the row-receiving area of a harvester row unit to remove cotton from the plant. The rotating spindles are then moved under the face of a doffer of the type exemplified in U.S. Pat. No. 4,644,736, Cerney et al, of common ownership with the present invention. The tangential velocity of the doffer is significantly greater than that of the spindle, and the motion of the doffer relative to the spindle unwraps cotton from the spindle, strips the cotton off the end of the spindle, and propels the cotton into a conveying air stream.

A conventional doffer has radially configured straight-edged lugs molded into the working face of the doffer disc to facilitate the doffing action. The action of the radially configured lugs provides a large stripping force component and a relatively small unwrapping force component. As a result of the distribution of force components, unwrapped cotton is frequently forced between the spindle and the doffer. As the wrapped spindles are forced through the doffer, the leading or working edges of the lugs wear, and the lugs flex. Doffer wear and chunking out of pieces of the lugs because of the lug flexure results in significantly reduced doffer life and need for frequent doffer adjustment. To prevent failure due to wrapped spindle induced flexure stress, doffers must be made of a more supple material; however, such a material typically does not have the wear resistance of a harder material so that wear is sacrificed for chunking resistance.

The radial lugs also have an instantaneous point of contact with the spindles at the outer leading edges of the lugs, and the remainder of the lug edge backs off from the spindle as the doffer rotates. As a result, the outer leading edges of the lug wear faster than the radially inward portions. Doffer pads often have to be replaced before the inner portions of the leading edges are worn significantly.

Propelling the cotton doffed from the spindles into the conveying air stream is an important function of the rotating doffer. Since the angle of contact between the spindle and leading edge of a radial doffer lug varies as the spindle passes through the doffing zone, the trajectory from the doffer is diffused. Also the distance of trajectory is relatively short because of the inefficient unwrapping action of the radial lug.

Present doffer lug configuration also requires that the spindles remain in the doffing zone a relatively long period of time for proper doffing. As a result, the cam and cam follower arrangement that orients the bars of spindles is subject to heavy loading and wear in the doffing zone.

The doffing action of the doffers frequently results in twists in the lint of the cotton boll (known as "prep"). Presence of prep lowers the grade of cotton and results in a lower prices for the farmer.

Doffing action of presently available doffers limits the range of crop conditions over which satisfactory picker operation can be achieved. In marginal conditions, less than optimal doffer efficiency can make the difference between being able to pick and not being able to pick.

BRIEF SUMMARY OF THE INVENTION

It is therefore an object of the present invention to provide an improved doffer for a spindle-type cotton harvester. It is another object to provide such a doffer which overcomes most or all of the above-mentioned disadvantages of previously available doffers.

It is a further object of the present invention to provide an improved spindle doffer with a lug configuration which enhances doffing action. It is another object to provide such a doffer which has significantly improved stripping and unwrapping action compared to most previously available doffers. It is yet another object to provide such a doffer which reduces grade reducing twists in the lint known as prep.

It is still another object of the present invention to provide a doffer which reduces the amount of unwrapped cotton on the spindle so that less cotton is forced between the picker spindle and the doffer. It is another object to provide such a doffer which improves doffing action to reduce doffer wear and lug chunking.

It is yet another object to provide a doffer having improved scissors action between the spindles and doffer lugs for increased wear distribution and better doffer wear life. It is still another object to provide such a doffer having a lug configuration which improves cotton throwing ability.

A doffer is provided which has non-radial lugs to provide a better distribution of stripping and unwrapping force components for enhanced doffing action. The leading edges of the lugs are curved and are angled with respect to the radial direction to provide a scissors action relative to the spindles as the doffer rotates for improved doffing and wear distribution. The lugs provide immediate unwrapping component upon initial contact with the cotton-wrapped spindles with less stripping action to reduce the amount of cotton forced between the spindles and the doffer. Wear, flexing and chunking are reduced, and harder doffer materials can be used for longer doffer life with less frequent adjustment of the doffer column. The curved, non-radial lug configuration also provides a constant angle of engagement between the spindle and doffer lug for better throwing action of the doffed cotton toward the conveying air stream.

In one embodiment of the invention, two sets of differently pitched lugs are alternated. The set of lugs having the largest pressure angle provides a large unwrapping component and the set of lugs with the smaller pressure angle provides a large stripping force component.

The improved doffer allows satisfactory picker operation over a broader range of crop conditions. Productivity is further increased as doffer replacement and adjustment intervals are extended. Prep is reduced for a higher grade of cotton. Since doffing efficiency is increased with the new doffer configuration, cam and cam follower wear can be reduced by altering the cam design so that the spindles spend less time passing through the doffer zone.

These and other objects, features and advantages of the present invention will become apparent to one skilled in the art upon reading the following detailed description in view of the drawings.

DETAILED DESCRIPTION OF THE DRAWINGS

Figure 1:
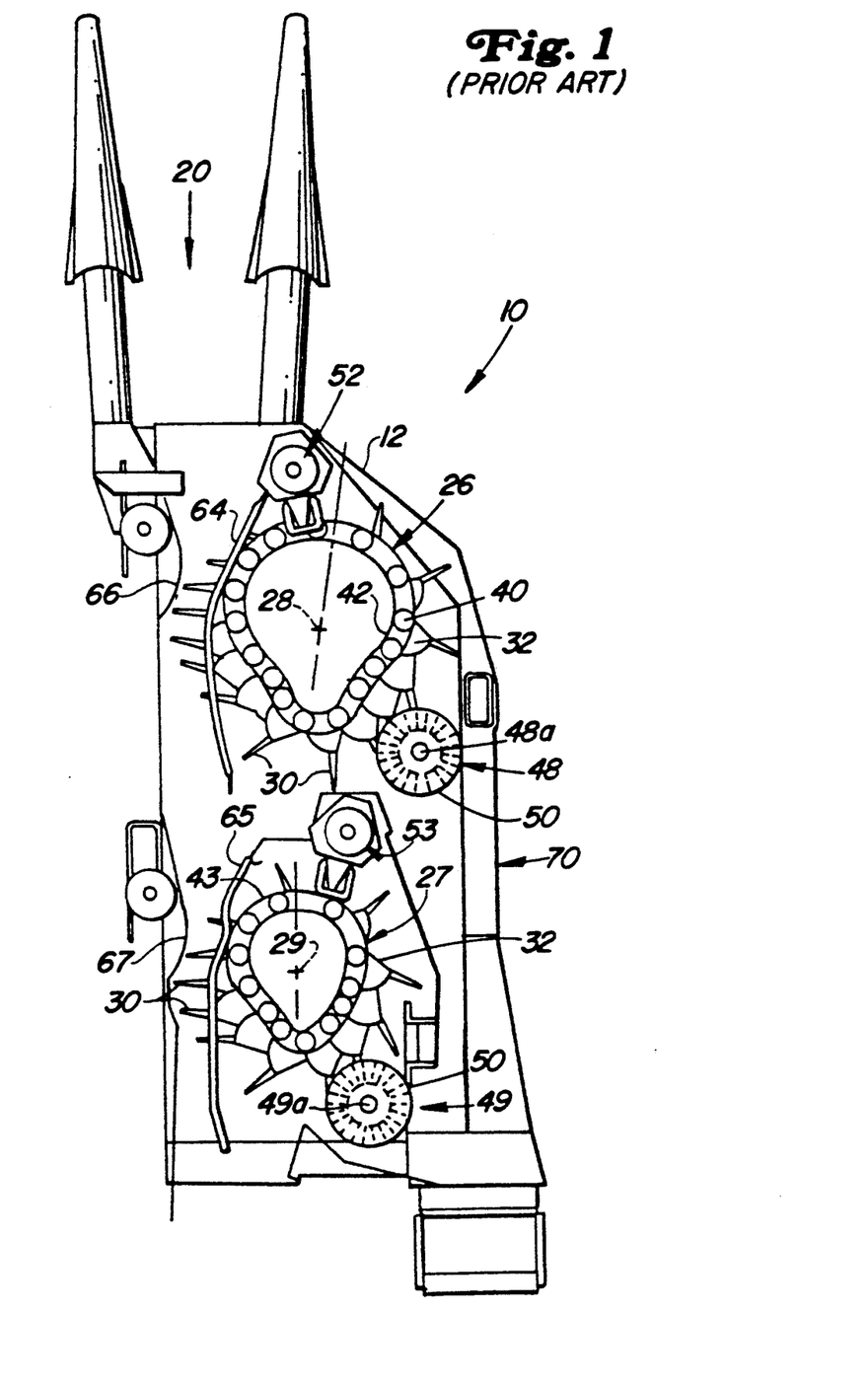
FIG. 1 is a top view of a cotton picker row unit including doffer columns with doffers typical of the prior art.

Referring now to FIG. 1, therein is shown a conventional row unit 10 for a cotton picker. A fore-and-aft extending row-receiving area 20 is defined which extends rearwardly from between a pair of stalk lifters 22 through to the rear of the housing. Front and rear upright picker drums 26 and 27 with upright rotational axes 28 and 29 are supported within the housing 12 and include spindles 30 supported in rows by a plurality of upright picker bars 32 supported for rotation about upright axes 36 (FIG. 2) uniformly spaced about a circle which centers on the rotational axes 28 and 29 of the respective drums. Each picker bar 32 includes a cam arm 38 (FIG. 2) with an upper cam roller 40 supported within the track of a cam 42 or 43 for the drum 26 or 27, respectively, which orients the bars 32 for the desired spindle position as the drum rotates about its upright axis. The spindles enter the row-receiving area 20 in the first and second quadrants (as viewed in FIG. 1 in the counterclockwise direction from the forwardmost extremity of the drum).

Doffer columns 48 and 49 with doffers 50 are supported for rotation about upright axes 48a and 49a parallel to and rearwardly and outwardly of the corresponding drum axes 28 and 29 (i.e., in the third quadrant from the forwardmost extremity of the drum). The doffers 50 are of the type illustrated and described in the aforementioned U.S. Pat. No. 4,644,736 and include a plurality of radially extending raised lugs 50L spaced circumferentially around a central hub plate 50H. A conventional drive mechanism (not shown) rotates the drums, spindles and doffers. The relative rotation of the drum 26, the spindles 30 and the doffers 50 over the spindles are shown by the arrows in FIG. 2. As the spindle 30' initially moves into doffing relationship with the doffer 50, the front edges of the radial lugs 50L approach the spindle 30' at an angle generally perpendicular to the axis 30a of the spindle so that a large axial stripping force is first applied to the cotton on the spindle. It is not until the spindle passes a substantial distance through the column 48 and approaches a doffer exit position (see spindle 30" of FIG. 2) that there is a substantial velocity component perpendicular the spindle for unwrapping the cotton. The tangential velocity of the doffer 50 is greater than that of the spindle at 30" so that the doffer 50 overruns the spindle and unwraps the cotton.

Figure 2:
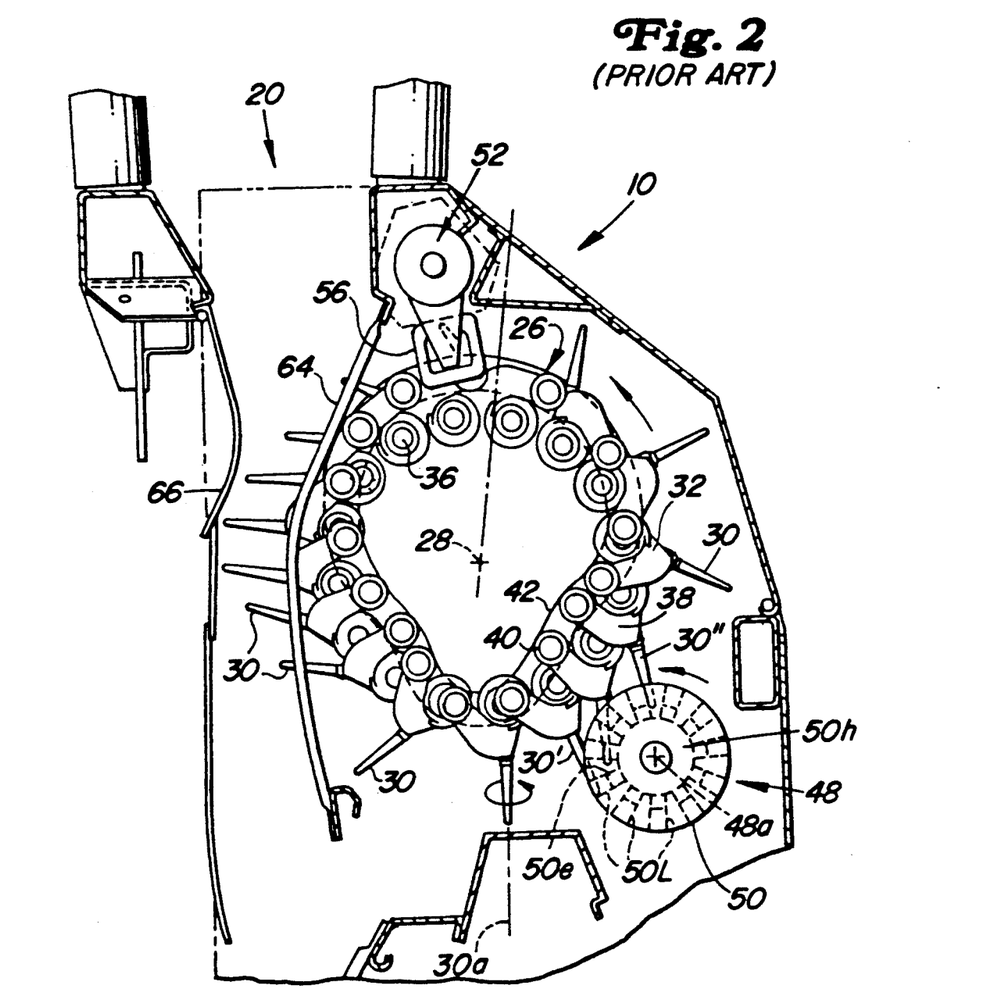
FIG. 2 is a top view of the forward portion of the row unit of FIG. 1, enlarged to better show the spindle path relative to the doffer lugs under a conventional radially lugged doffer.

The cam 42 has rear comma-shaped configuration to accelerate the spindles 30 quickly from the row receiving area 20 and retain the spindles in the doffing zone a sufficient time for effective dolling. As a result, relatively high acceleration loads are present on the cam and cam follower in and adjacent the doffer zone.

Supported adjacent the forwardmost extremities of the drums 26 and 27 (in the fourth quadrant) are upright moistener columns 52 and 53 with pads 56 for wiping the spindles 30 after cotton is doffed therefrom. As the drums 26 and 27 rotate in the counterclockwise direction as viewed in FIGS. 1 and 2, the spindles 30 are controlled by the cam arm 38 so that the spindles project into the row-receiving area through grid bars 64 and 65 and rotate in contact with the cotton. Pressure plates 66 and 67 urge the plants inwardly toward the spindles 30. The cotton-wrapped spindles 30 are accelerated under the doffers 50 of the doffer columns 48 and 49, and cotton is doffed from the spindles and thrown rearwardly and outwardly by the doffers 50 to door structure 70 (FIG. 1) from which it is conveyed to the harvester basket (not shown) by an air stream.

DESCRIPTION OF THE INVENTION

Figure 3:
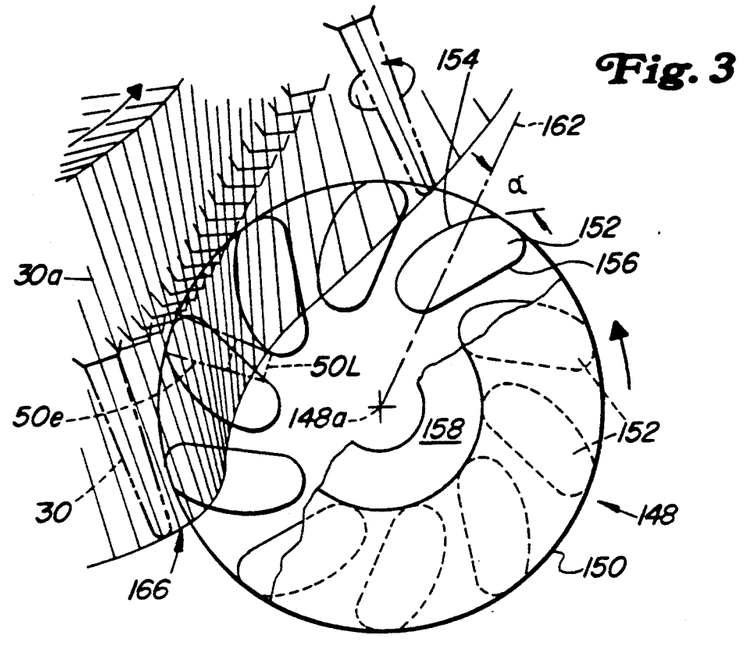
FIG. 3 is an enlarged view, partially broken away to better show several of the doffer lugs, of one embodiment of the invention showing a doffer with an involute lug profile having a pressure angle of approximately 40 degrees; the spindle path relative to a doffer is indicated by a progression of spindle axis lines to show the relative angle between the spindle axis and the doffer lugs, and a radial lug of a prior art doffer is superimposed on the view for comparison purposes.

Referring now to FIG. 3, therein is shown an improved doffer column 148 with doffers 150 having a plurality of lugs 152 with curved leading edges 154 and curved trailing edges 156 supported from a base or disc portion 158. The lugs 152 are spaced uniformly around the circumference of the doffer 150. With the exception of the lug configuration, the doffer construction may be generally as shown and described in the aforementioned U.S. Pat. No. 4,644,736.

As shown in FIG. 3, the lugs 152 are identical and have a radially outermost portion that trails the corresponding radially inwardmost portion in the direction of rotation (arrow). The leading edge 154 forms an acute angle $\alpha$ with a radial line 162 extending parallel to the disc portion 158 from the doffer axis 148a through the front edge. Compared to the lug 50L of a prior art doffer with the straight radially extending leading edge 50e, the curved leading edge 154 provides a substantially greater unwrapping component and a smaller stripping force component in the area that the spindle 30 first moves into doffing relationship with the doffer (indicated generally at 166). The trailing or back edges 156 of the lugs 152 are curved to increase the space between lugs and improve the cotton throwing capability of the doffer.

In the preferred embodiment, the front edges 154 of the lugs 152 are in the shape of, or closely approximate, an involute curve such that as the edge 154 acts against the spindle 30, the angle of action between the spindle and the edge 154 remains generally constant. As shown in FIG. 3, an acute angle B1 is formed between the edge 154 and the spindle, which is substantially smaller than a corresponding angle B2 defined by the edge of the conventional lug 50L. The resultant constant angle scissoring action between the spindle and lug 152, in addition to the larger unwrapping component throughout the doffing zone, significantly improve doffing efficiency. The constant angle scissoring action provides better cutting of wrapped cotton that for any reason builds up on the spindle and cannot be doffed normally.

Figure 11:
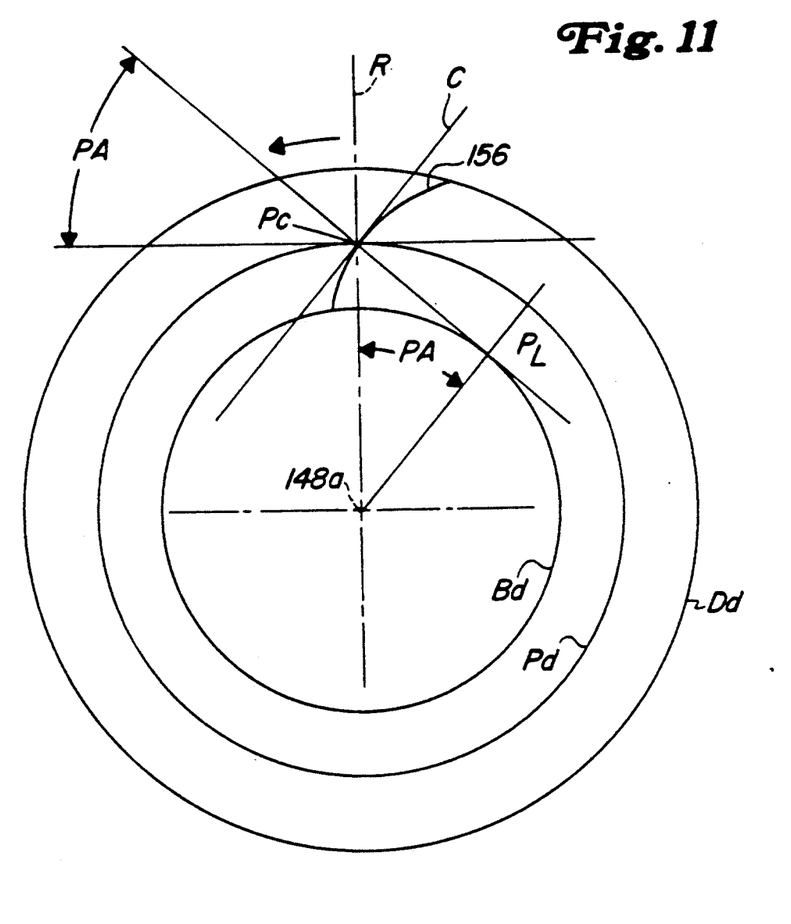
FIG. 11 is a view illustrating the doffer lug leading edge involute curve having a pressure angle of 40 degrees.

To achieve the involute curve, the lugs 154 may be formed using well-known hob tooth generation techniques. A forward lug edge 40 degree pressure angle involute curve is shown in FIG. 3 and illustrated in FIG. 11. Referring to FIG. 11, with the point of contact (Pc) located on the zero degree reference line (R) which passes through the axis 148a of the doffer having an outside diameter (Dd), a line of contact (C) is defined tangent to the involute curve 156 at Pc. The base diameter circle is shown at Bd. A line (PL) perpendicular to the line of contact C at the contact point Pc on the pitch diameter (Pd) defines a pressure angle (PA) which, as shown for the doffer is 40 degrees. Generation of a curvilinear edge which approximates the desired involute curve is discussed below in relation to FIGS. 9 and 10.

Figure 4:
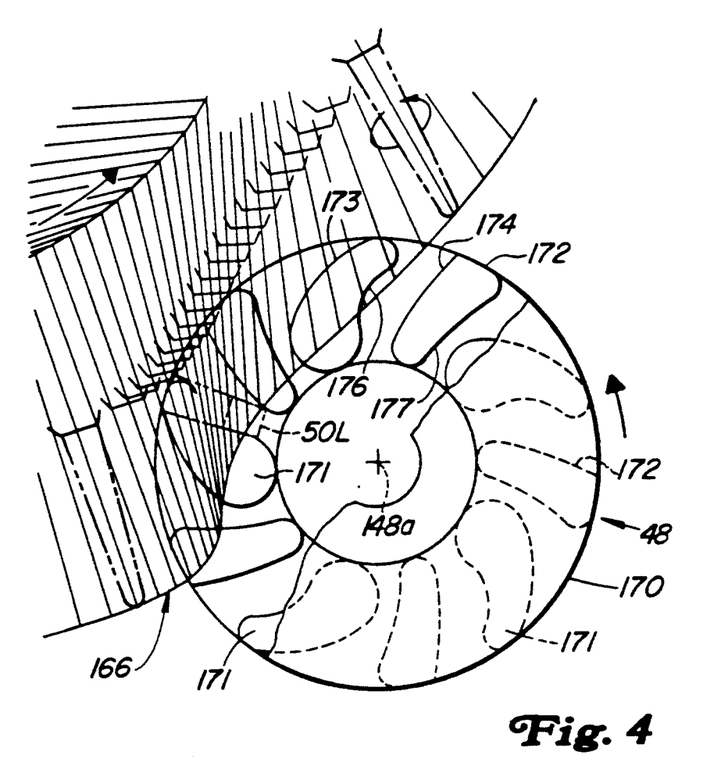
FIG. 4 is a view similar to that shown in FIG. 3 but showing a doffer having dissimilar alternating sets of lugs of different pitches, one set of the lugs presenting a high unwrapping component and the other set presenting a high stripping component.

In the embodiment shown in FIG. 4, a doffer 170 includes lugs 171 and 172 of different pitches spaced around the circumference of the doffer. The lugs 171 and 172 have a leading edges 173 and 174, respectfully. The edge 173 forms an angle with a radial line through the lug 171 which is greater than the angle that the edge 174 forms with a radial line through the lug 172 so that the lugs 171 provide a greater unwrapping component compared to the lugs 172. The lugs 172 have a pitch more closely approximating a radial lug and provide a greater stripping component compared to the lugs 171. As shown in FIG. 4, the lugs 171 and 172 have pressure angles of approximately 55 degrees and 20 degrees, respectively, and are alternatingly disposed in equally spaced relationship around the circumference of the doffer. Radial lugs such as shown at 50L may also be used in place of one or more of the curved lugs 172 to achieve a larger stripping component. The lugs 171 and 172 have trailing edges 176 and 177 which are curved.

Figure 5:
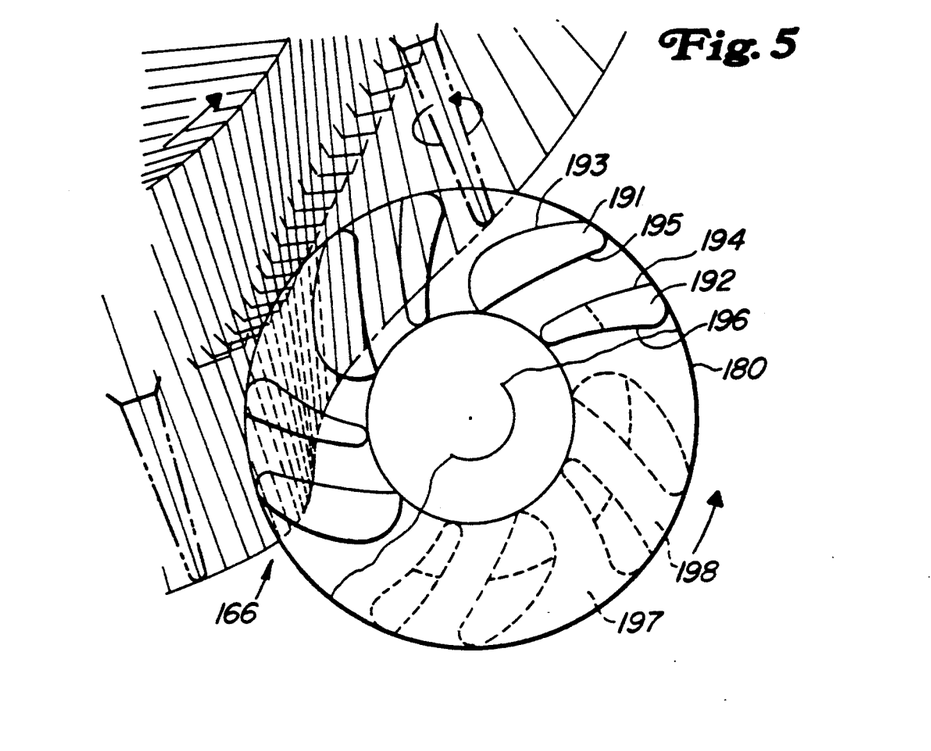
FIG. 5 is view similar to that shown in FIG. 4 but showing a doffer having a different lug shape.

In the embodiment of FIG. 5 a doffer 180 is shown similar to the doffer 170 of FIG. 4 and includes lugs 191 and 192 having pressure angles of about 55 degrees and 20 degrees, respectively. Leading edges 193 and 194 are curved, as are corresponding trailing edges 195 and 196. The lugs 191 and 192 are narrower and the trailing edges 195 and 196 have greater radii of curvatures than the corresponding lugs 171 and 172 of the doffer 170 so that larger grooves 197 and 198 are defined between the lugs 191 and 192 for enhanced cotton throwing action.

Figure 6:
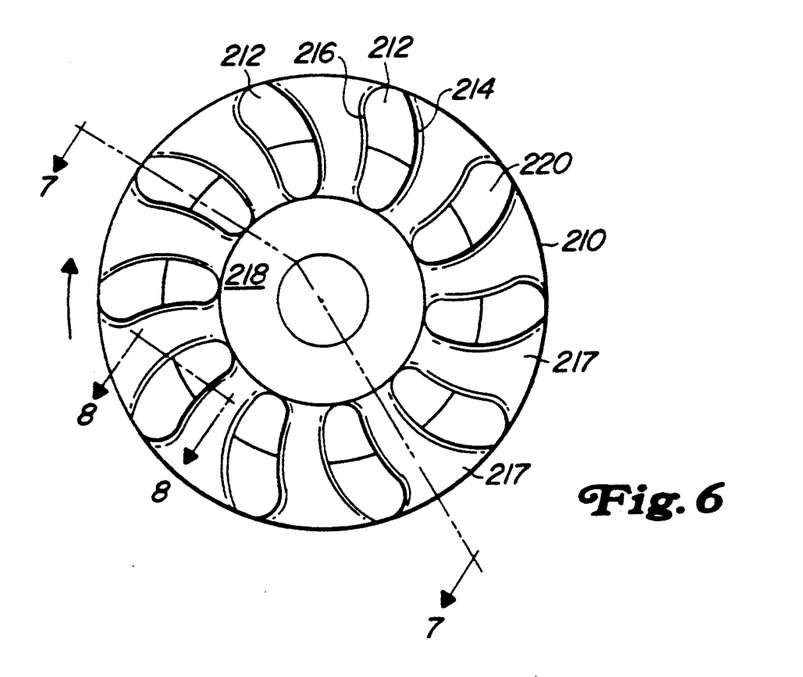
FIG. 6 is a lug-side planar view of a doffer similar to that shown in FIG. 3 but having a higher lug pressure angle for an increased unwrapping component.
Figures 7, 8, 10:
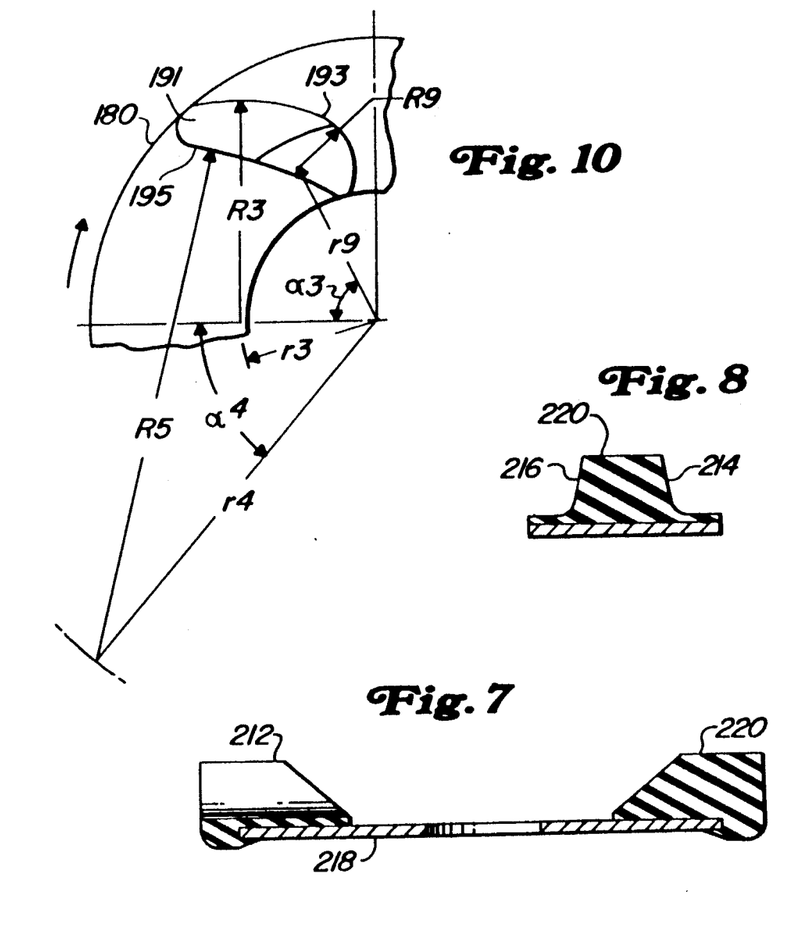
FIG. 7 is a sectional view taken generally along lines 7—7 of FIG. 6.
FIG. 8 is a sectional view of a doffer lug, the view taken generally along the lines 8—8 of FIG. 6.
FIG. 10 is a view similar to FIG. 9 showing the details of the generation of the leading and trailing curved edges of the high angle unwrapping lugs.
Figure 9:
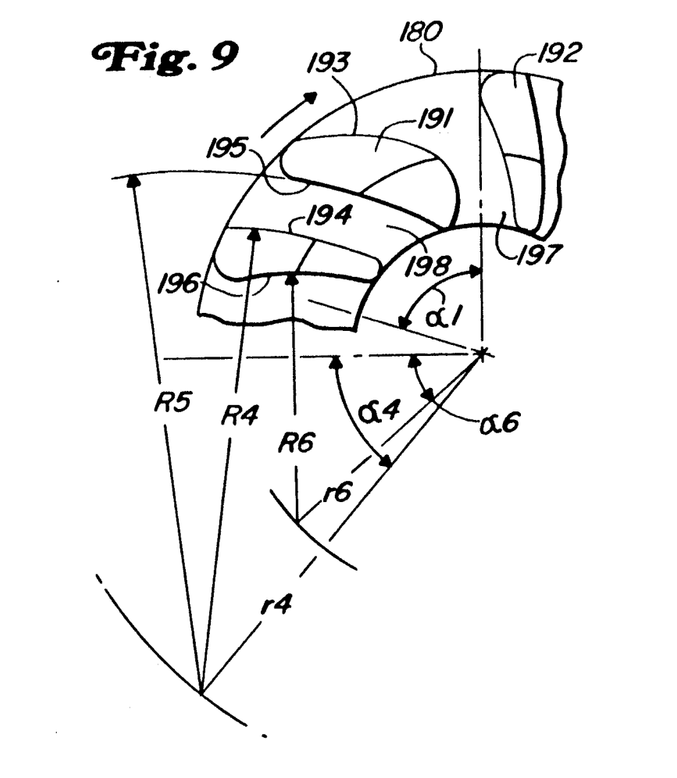
FIG. 9 is an enlarged lug-side planar view of a portion of the doffer shown in FIG. 5 and illustrating the generation of the lug edges in shapes which approximate an involute curve.

The generation of the lug structure for the doffer 180 is best seen in FIGS. 9 and 10. The set of stripping lugs 192 are spaced around the periphery of the doffer 180 at equal intervals of 72 degrees ($\alpha 1$), and the set of unwinding lugs 191 are equally spaced therebetween for providing alternating high unwrapping and high stripping force components. The trailing edge 195 of a lug 191 and the leading edge 194 of the adjacent lug 192 are struck on radii of curvatures R4 and R5, respectively, centered on a point outside the circumference of the doffer on a radial line r4 for providing good cotton throwing action from the groove 198. The leading edge 193 of the lug 191 lies on an arc of radius R3, substantially smaller than R5, centered on a point radially inward of the doffer circumference and lying on a radial line r3. Inwardmost portion 199 of the lug 191 is curved in the rearward direction with a relatively small radius of curvature R9. By way of example only, the following are preferred values for the variables of FIGS. 9 and 10 for a doffer of radius of approximately 3.13 inches:

$R3 = 2.45$ (inches)
$R4 = 5.22$
$R5 = 5.83$
$R6 = 2.79$
$R9 = 0.625$
$r3 = 1.52$
$r4 = 4.90$
$r6 = 2.77$
$r9 = 1.91$
$\alpha 1 = 72$ (degrees)
$\alpha 3 = 63$
$\alpha 4 = 50$
$\alpha 6 = 42$ Doffer 210 (FIGS. 6–8) is similar to the doffer 150 of FIG. 3 but has lugs 212 with curvilinear leading edges 216, each preferably in the form of an involute curve with a pressure angle of approximately 30 degrees. Trailing edges 216 are curved and define relatively wide, open grooves 217. The lugs 212 are supported on a planar disc 218, and have a generally planar top portion 220 parallel to the disc 218. As best seen in FIG. 8, the leading and trailing edges 214 and 216 are angled from the vertical a few degrees, preferably 11 degrees or less, and converge in the direction of the top portion 220. At locations 224 which lie on a circle centered on the rotational axis of the doffer 210, the lugs angle downwardly and inwardly toward the central portion of the disc 218.

Having described the preferred embodiment, it will become apparent that various modifications can be made without departing from the scope of the invention as defined in the accompanying claims. For example, although specific lug shapes and lug shape generating techniques have been described herein, it is to be understood other lug shapes and generating techniques may be utilized. One example of such a curvilinear forms is cycloidal curve (derived from cycloidal gear tooth forms). Although the description has been made for in-line picking units which have the same direction of rotation for all doffers, the concepts discussed herein also apply to conventional straddle-row cotton harvesters such as the John Deere Model 9930 Cotton Picker using lugs spiraled in the opposite direction for reversed doffer rotation. The doffers made for rotation in the opposite direction are substantially mirror images of the doffers described herein.

What is claimed is:

1. In a cotton harvester row unit having a drum with spindles rotatable about spindle axes, a doffer adapted for mounting for rotation in doffing relationship with the spindles for unwrapping cotton from the spindles and pushing the cotton off the spindles, the doffer comprising:

a generally planar base portion having an axis of rotation; and a plurality of lugs located radially outwardly of the axis of rotation, the lugs having leading edge in the direction of rotation offset at an angle to a radial line extending from the axis of rotation of the doffer through the leading edge so that the leading edge has a substantial component parallel to the spindle axes as the doffer rotates in doffing relationship with the spindles.

2. The invention as set forth in claim 1 wherein the leading edges of the lugs are curved.

3. The invention as set forth in claim 1 wherein the leading edge is curved and includes radially outwardmost and radially inward portions, the radially outwardmost portion trailing the radially inwardmost portion in the direction of rotation of the doffer.

4. The invention as set forth in claim 3 wherein the leading edge is substantially curvilinear in shape and defines with the spindles a sustained scissors action along the leading edge while the doffer is in doffing relation with the spindle.

5. The invention as set forth in claim 1 wherein the doffer includes lugs with leading edges having different angles relative to radial lines extending from the axis of rotation of the doffer through the lug edge, and means supporting the lugs from the base portion for providing varying unwrapping and stripping force components from one lug to the next.

6. In a cotton harvester having a revolving drum with rotating spindles rotating about spindle axes, the drum moving the spindles in spindle paths, a doffer mounted for rotation about a doffer axis, the doffer located adjacent the spindle paths and having a tangential velocity relative to the spindles which is greater than that of the spindles for unwrapping cotton from the spindles and pushing the cotton off the spindles, wherein the axes of spindles approach an attitude perpendicular to a radial line extending from the center of the doffer to the initial point of contact between the doffer and the spindles, and the axes of the spindles approach an attitude parallel to a radial line extending from the center of the doffer to the point on the circumference of the doffer that the spindles exit the doffer, the doffer comprising:

a plurality of angled lugs located radially outwardly of the axis of rotation of the doffer, each of the angled lugs having a leading edge in the direction of rotation offset at an angle to a line which extends radially from the axis of rotation through the leading edge so that the angle of contact between the lug edge and the spindles is substantially less than 90 degrees to thereby provide a substantial cotton unwrapping component adjacent the point of contact between the spindle and the doffer.

7. The invention as set forth in claim 6 wherein the leading edge of the angled lug, as viewed in the direction of the axis of rotation of the doffer, is curved.

8. The invention as set forth in claim 6 wherein the lugs have a radially outermost portion and a radially inward portion, the radially outwardmost portion trailing the radially inward portion in the direction of rotation of the doffer.

9. The invention as set forth in claim 8 wherein the leading edge of the lugs, as viewed in the direction of the axis of rotation of the doffer, is curved.

10. The invention as set forth in claim 9 wherein the leading edge of the angled lugs as viewed in a plane perpendicular to the axis of rotation of the doffer comprises a curve, wherein the angle between a line tangent to the curve and a line tangent to the spindle at the point of contact of the curve and the spindle remains generally constant as the spindle moves adjacent the doffer to thereby provide a generally constant scissors action between the lug and the spindle to help prevent cotton build-up on the spindle.

11. The invention as set forth in claim 10 wherein the curve comprises an involute curve.

12. The invention as set forth in claim 6 wherein the doffer further comprises at least one stripping lug disposed between the angled lugs, the stripping lug having a leading edge in the direction of rotation offset at an angle to a line which extends radially from the axis of rotation through the leading edge of the stripping lug such that the stripping lug leading edge contacts the spindles at an angle with the spindle axes of substantially greater than forty-five degrees to thereby provide more stripping action and less unwrapping action than the angled lugs.

13. The invention as set forth in claim 12 wherein the stripping lug has a leading edge lying generally on a line extending radially from the axis of rotation of the doffer.

14. The invention as set forth in claim 12 wherein the stripping lug has a leading edge which, when first contacting the spindles, defines an angle between the leading edge and axes of the spindles of approximately 90 degrees.

15. The invention as set forth in claim 12 wherein the stripping lugs are spaced equidistantly about the circumference of the doffer between the angled lugs.

16. In a cotton harvester having a revolving drum with rotating spindles rotating about spindle axes, the drum moving the spindles in spindle paths, a doffer mounted for rotation about a doffer axis, the doffer located adjacent the spindle paths and having a tangential velocity relative to the spindles which is greater than that of the spindles for unwrapping cotton from the spindles and pushing the cotton off the spindles, wherein the axes of spindles approach an attitude perpendicular to a radial line extending from the center of the doffer to the initial point of contact between the doffer and the spindles, and the axes of the spindles approach an attitude parallel to a radial line extending from the center of the doffer to the point on the circumference of the doffer that the spindles exit the doffer, the doffer comprising:

a plurality of angled lugs located radially outwardly of the axis of rotation of the doffer, each of the angled lugs having a leading edge in the direction of rotation offset at an angle to a line which extends radially from the axis of rotation through the leading edge so that the angle of contact between the lug edge and the spindles is substantially less than 90 degrees to thereby provide a substantial cotton unwrapping component adjacent the point of contact between the spindle and the doffer.

17. The invention as set forth in claim 16 wherein the leading edges of the lugs are curvilinear.

18. The invention as set forth in claim 17 wherein the pitch of the angled lugs varies from lug to lug to provide varying unwrapping and pushing off components from lug to lug.

19. A doffer adapted for mounting for rotation in a preselected direction in doffing relationship with the spindles of a cotton harvester picker drum for removing cotton from the spindles, the doffer comprising:
a base portion having an axis of rotation; and
a plurality of lugs supported from the base portion and located radially outwardly of the axis of rotation, the lugs having a leading edge in the direction of rotation offset at an angle to a radial line extending from the axis of rotation of the doffer through the leading edge.

20. The invention as set forth in claim 19 wherein the leading edges of the lugs are curved.

21. The invention as set forth in claim 19 wherein the leading edges are curvilinear and include radially outwardmost and radially inward portions, the radially outwardmost portion trailing the radially inwardmost portion in the direction of rotation of the doffer.

22. The invention as set forth in claim 21 wherein the lugs include trailing edges opposite the leading edges, wherein the trailing edges are angled with respect to a radial line extending from the axis of rotation of the doffer through the trailing edge.

23. The invention as set forth in claim 22 wherein the trailing edges are curved.

* * * * *